Patented Apr. 6, 1926.

1,579,989

UNITED STATES PATENT OFFICE.

WILHELM WILD AND CARL EYER, OF LUDWIGSHAFEN-ON-THE-RHINE, GERMANY, ASSIGNORS TO BADISCHE ANILIN- & SODA-FABRIK, OF LUDWIGSHAFEN-ON-THE-RHINE, GERMANY, A CORPORATION OF GERMANY.

MAKING A CALCIUM-NITRATE FERTILIZER.

No Drawing.    Application filed June 29, 1925. Serial No. 40,439.

*To all whom it may concern:*

Be it known that we, WILHELM WILD and CARL EYER, citizens of the German Empire, residing at Ludwigshafen-on-the-Rhine, Germany, have invented new and useful Improvements in Making a Calcium-Nitrate Fertilizer, of which the following is a specification.

It has been proposed to make a calcium nitrate fertilizer by combining calcium nitrate with urea. We have found that solutions of calcium nitrate containing urea can be advantageously converted into a dry fertilizer in a form in which it can be readily distributed without further treatment, by making the hot solutions into a spray in a stream of gas. The spray can be produced by mechanical means or simply by means of the gas itself, for example by compressed air. The spray solidifies readily in the atmosphere of gas forming a solid salt of desirable properties and as no mother liquors are obtained in this process, no evaporating boiling down of such liquors is accordingly required.

The proportion of urea added to the calcium nitrate solution may correspond to about that required to form the double compound, or four molecules of urea for each one molecule of calcium nitrate, or it may be smaller, down to about one molecular proportion of urea for each one molecular proportion of calcium nitrate. When employing smaller amounts of urea than those corresponding to the double compound, the concentration of the calcium nitrate solution should be as high as possible, or at least 70 degrees Baumé, in order to secure ready solidification of the sprayed mass in the gaseous medium and generally with such smaller amounts of added urea, either a drying treatment should follow, or heated air or other hot gas be employed when the mixture is sprayed, in order to remove any residual moisture and directly to produce as dry a product as possible.

The invention is more fully explained by the following examples, but the invention is not restricted to these examples.

*Example I.*

A concentrated solution of calcium nitrate of about 65 degrees Baumé and having a temperature of from 80 to 100 degrees centigrade is mixed with urea in the proportion of 1900 kilograms of the latter for each cubic metre of the calcium nitrate solution. The hot mixture is sprayed by means of compressed air in a suitable nozzle and the spray falls down directly in the form of practically dry grains which are at once ready for spreading. No aftertreatment is ordinarily necessary, though in certain cases, for example when calcium nitrate is present in excess or when the salt is to be stored for a longer period, the properties of the product can be further improved by suitable drying, for example in a revolving drier.

Urea may also be employed in a highly concentrated solution.

*Example II.*

640 kilograms of urea are introduced, while stirring, into 1000 kilograms of calcium nitrate solution of about 2.05 spec. gr. at a temperature of from about 110 to 120 degrees centrigrade. The mixture is then sprayed at about 95 degrees centigrade by means of compressed air with the aid of a suitable nozzle. A granular, practically dry fertilizer salt suitable for spreading is obtained.

What we claim is:

1. The process of making a calcium nitrate fertilizer which consists in making a hot concentrated solution containing calcium nitrate and urea into a spray in a stream of gas.

2. The process of making a calcium nitrate fertilizer which consists in making a hot concentrated solution containing calcium nitrate and urea in the proportions of between about one and four molecular weights of the latter for each one molecular weight of the former into a spray in a stream of gas.

3. The process of making a calcium nitrate fertilizer which consists in making a hot concentrated solution containing calcium nitrate and urea in about the proportions of the double compound, into a spray by means of a compressed gas.

4. The process of making a calcium nitrate fertilizer which consists in making a hot concentrated solution containing calcium nitrate and urea in about an equimolecular proportion into a spray by means of a compressed gas.

5. As a new article of manufacture, a product containing calcium nitrate and urea in the form of globular granules as obtained by the solidification of liquid drops.

6. As a new article of manufacture, a product containing calcium nitrate and urea in the proportions of between one and four molecular weights to each one molecular weight of calcium nitrate in the form of globular granules as obtained by the solidification of liquid drops.

In testimony whereof we have hereunto set our hands.

WILHELM WILD.
CARL EYER.